(12) United States Patent
Alakuijala et al.

(10) Patent No.: US 8,160,372 B1
(45) Date of Patent: Apr. 17, 2012

(54) OPTIMIZED BACKWARD REFERENCE SELECTION WITH REDUCED ENTROPY FOR IMAGE COMPRESSION

(75) Inventors: Jyrki Alakuijala, Adliswil (CH); Hannu Helminen, Zurich (CH); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 1007 days.

(21) Appl. No.: 12/014,964

(22) Filed: Jan. 16, 2008

(51) Int. Cl.
*G06K 9/36* (2006.01)
(52) U.S. Cl. .................. 382/232; 382/239; 382/246
(58) Field of Classification Search .......... 382/232, 382/233, 246, 239, 166; 707/740, 968; 700/31; 702/20; 345/560; 341/63, 65; 358/524, 358/1.9
See application file for complete search history.

(56) References Cited

U.S. PATENT DOCUMENTS
5,805,735 A * 9/1998 Chen et al. .................. 382/239
* cited by examiner

*Primary Examiner* — Anh Hong Do
(74) *Attorney, Agent, or Firm* — Fenwick & West LLP

(57) ABSTRACT

A system (and a method) are disclosed for optimizing lossless data compression in digital images systems. The system includes an optimized backward reference selection module and an entropy encoder. The optimized backward reference selection module selects the backward references that the backward reference distances and/or lengths are an integer multiple of size of data elements. The optimized backward reference selection module further compacts the entropy code of the backward references by favoring backward references that have the intrinsic locality of source data stream. The optimization offered by the backward reference selection module allows an improved compression ratio and faster compression speed for lossless image compression.

24 Claims, 4 Drawing Sheets

OPTIMIZED BACKWARD REFERENCE SELECTION WITH REDUCED ENTROPY FOR IMAGE COMPRESSION

BACKGROUND OF THE INVENTION

1. Field of the Invention

The present invention relates generally to lossless data compression, and more particularly to optimizing backward reference selection to improve compression ratio in digital image systems.

2. Background

Existing lossless byte stream compression techniques, such as the Deflate data compression algorithm, incorporate commonly occurring patterns in source input data in order to increase amount of compression. These techniques build a list of commonly occurring patterns and encode the patterns by transmitting an index associated with each occurring pattern in the list. Deflate is widely used in gzip compressed files and Portable Network Graphics (PNG) images files. Improvements that are compatible to the current Deflate method can thus lead to significant savings in both data transfer bandwidth costs and persistent storage of data.

A typical Deflate compression method consists of two compression phases: backward reference selection followed by Huffman coding. The backward reference selection phase deploys a backward reference selection algorithm, such as LZ77 algorithm, for building a list of commonly occurring patterns in the source input data. The Huffman coding phase contains two Huffman tables for entropy encoding source input data and backward references. In LZ77 algorithm, the list of commonly occurring patterns is simply a portion of previously encoded sequence of source input data. To encode an input data stream, a LZ77 encoder moves a search pointer backward through the previously encoded sequence of input data searching for a match to the first data element of the input data stream. The LZ77 encoder achieves compression by continuously moving a search pointer backward through the previously encoded sequence of input data to find a longest match. Once the longest match is found, the encoder encodes it with a tuple (d, l), where d is the backward reference distance from the search pointer to the data element in the input stream following the match, and l is the length of the match.

Conventional backward reference selection algorithm in a Deflate implementation, like zlib, favors smaller backward distances when identical sequences exist. This approach is satisfactory when used for compression generic data files, since proximity in an input data stream also means similarity. Unfortunately, simply favoring smaller backward distances may result in increased entropy in the backward reference length codes. For compression of multi-component signals, such as a truecolor (red-green-blue) image, zlib or other general purpose Deflate implementation tries to match backward reference distances across the signal components, such as green component with blue one. This adds to the entropy of the backward reference distance histogram by including backward references whose distances are not aligned by the component size of an input signal.

Conventional backward reference selection algorithm in a Deflate implementation, also favors backward references with longer matches. For example, for a 24-bit truecolor image, when zlib finds a match of substrings of 4 bytes and another match of 3 bytes, zlib selects this 4 bytes substring as the backward reference. Thus, this 4-byte long match can also lead to increased entropy in the backward reference length codes. As result, the backward reference selection without taking into consideration the individual data components of the signal is not optimized, and thus tends to increase the entropy code length and to add unnecessary computational costs in finding the combinations between the individual components of the signal.

SUMMARY

A system and method selects a backward reference for each block of uncompressed data elements so as to result in reduced entropy of the backward reference. An optimized backward references selection module may be configured to select backward references for which the backward reference distances are an integer multiple of the size of the data element. The optimized backward references selection module may be additionally or alternatively configured to select the backward references for which the backward reference lengths are an integer multiple of the size of data element. The optimized backward references selection module may be additionally or alternatively configured to select the backward references based upon the intrinsic locality of the source data stream. These various embodiments of the backward references selection module allow an improved compression ratio and faster compression speed for lossless image compression.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
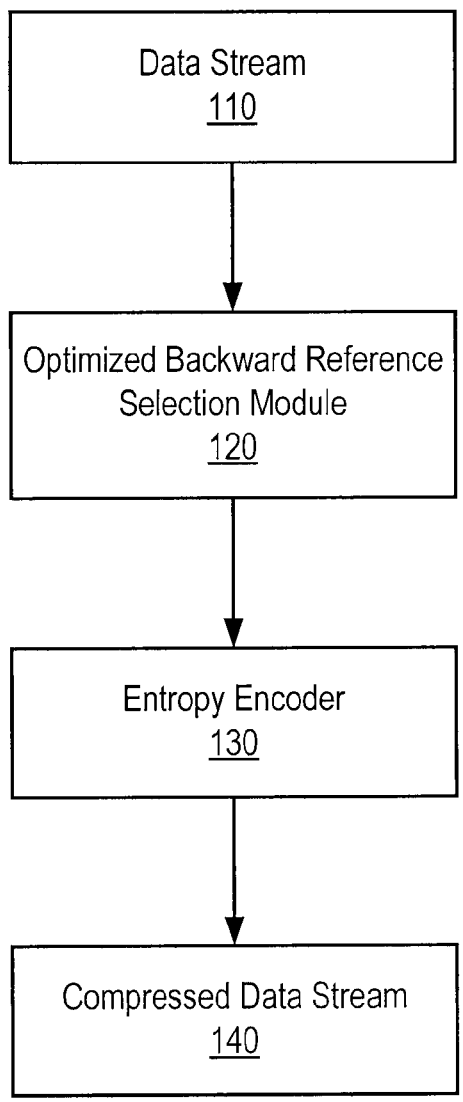
FIG. 1 is a block diagram illustrating a system having an optimized backward reference selection module according to one embodiment.

FIG. 1 is a block diagram illustrating a system 100 having an optimized backward reference selection module 120 according to one embodiment. In the example embodiments described below, the system 100 comprises an optimized backward reference selection module 120 and an entropy encoder 130. The system 100 also comprises a data stream 110 and a compressed data stream 140. The system 100 stores the data stream 110 in an input stream buffer and the compressed data stream 140 in an output stream buffer. The optimized backward reference selection module 120 reads the data stream 110 from the input stream buffer, selects an optimized backward reference for a plurality of data elements of the input stream 110 and sends the backward reference information to the entropy encoder 130 for further processing. The entropy encoder 130 entropy encodes the backward references and the input stream into a compressed data stream 140. This compressed data can then be stored on a computer readable medium, or transmitted over a computer network.

The data stream 110 comprises blocks of raw image data elements in an uncompressed format. Each data element has one or more data components, and each data component has a known size. The size of a data element is therefore the size of each data component multiplied by the number of the data components of the data element. For example, in a truecolor multi-component signal, such as a truecolor PNG image signal, each signal is represented by a data element with three data components representing red, green, and blue color. For a data component of one byte long, the size of a PNG truecolor data element is thus 3 bytes.

The optimized backward reference selection module 120 finds a backward reference for a plurality of uncompressed data elements being processed according to an optimized backward reference selection algorithm. In one embodiment, the optimized backward reference selection module 120 also comprises a reference buffer, for example of kilobytes (kB). The reference buffer stores blocks of most recently processed data elements by the optimized backward reference selection module 120. Each backward reference, i.e., match, found by the optimized backward reference module 120 is represented by a tuple (d, l), where d is the backward reference distance, and l is the length of the reference. The optimized backward reference selection algorithm selects the backward references in a way that leads to a lesser entropy of the generated backward references fed to the entropy encoding module 130.

The entropy encoder 130 receives the backward reference information for each block of data elements processed by the optimized backward reference selection module 120, and builds variable length code tables for encoding data elements of the input stream 110. A typical entropy encoder 130 may be implemented by Huffman coding. The entropy encoder 130 preferably contains two Huffman code tables, one for encoding data element symbols, i.e., literals, and backward reference lengths and/or backward reference length prefixes, and the other code table for encoding backward reference distances and/or backward reference distance prefixes. Those skilled in the art will recognize that Huffman coding is used only by way of example and that a variety of other entropy encoding schemes may be used.

Figure 2:
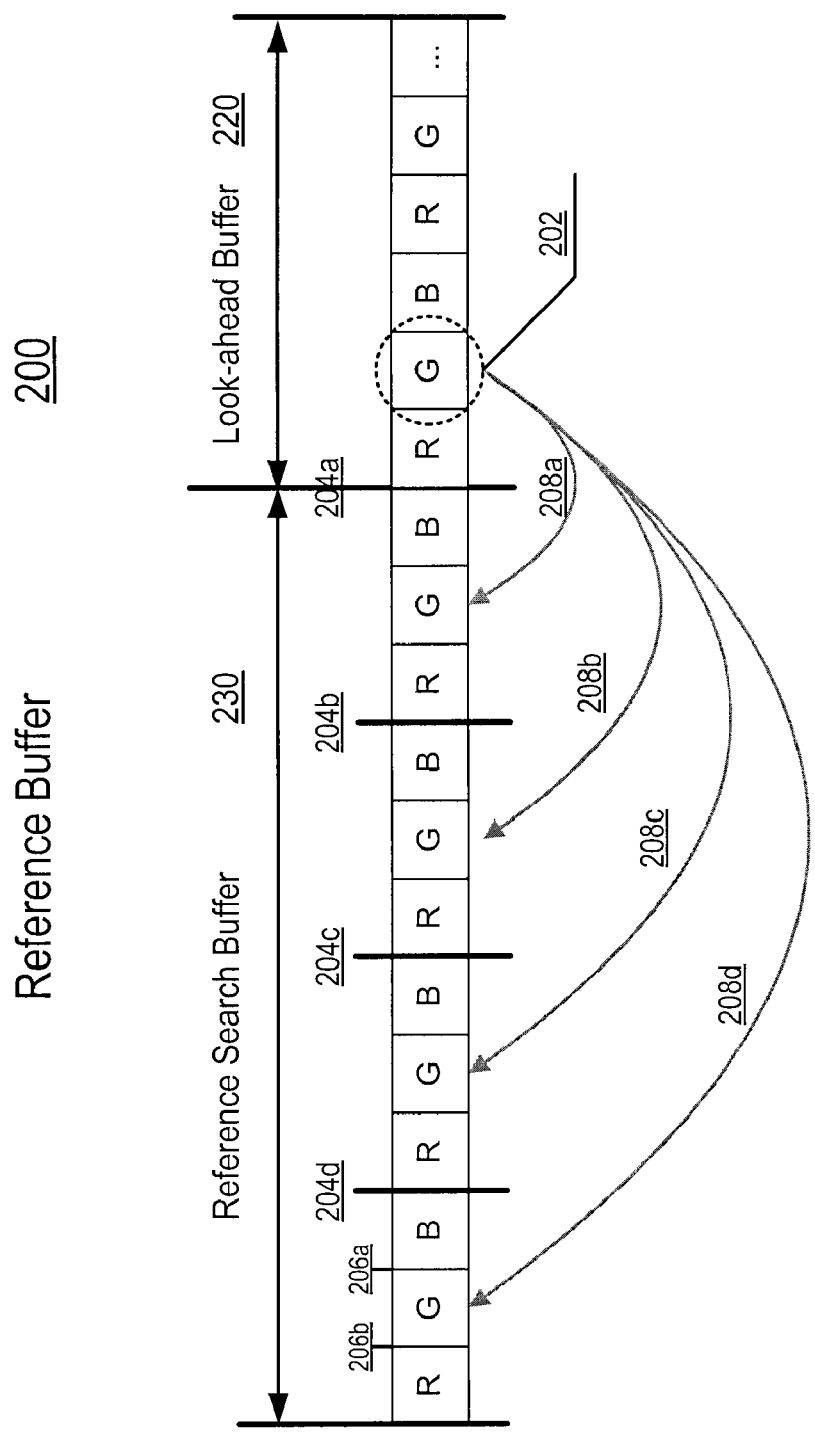
FIG. 2 is a block diagram illustrating an optimized backward reference selection module working with a reference buffer according to one embodiment.

FIG. 2 is a block diagram illustrating an optimized backward reference selection module 120 working with a reference buffer 200 according to one embodiment. The reference buffer 200, in the embodiment illustrated in FIG. 2, includes two parts, a reference search buffer 230 that contains a portion of the recently processed sequence of data elements, and a look-ahead buffer 220 that contains a portion of the sequence of data elements to be encoded. For example, the reference search buffer 230 in FIG. 2 stores four truecolor multi-component data elements, such as the truecolor PNG image signal represented by red (i.e., R), green (i.e., G), and blue (i.e., B) color components, each of which is three bytes in length. Each data element is bounded by a pair of byte boundaries (the thick vertical lines in FIG. 2), e.g., 204a and 204b. Each data component is bounded by its corresponding component boundaries, e.g., component G bounded by 206a and 206b. The circled component G 202 indicates the current data component being processed.

To encode a sequence of data elements in a look-ahead buffer, the conventional Deflate algorithms allow any sequence of bytes of data elements within the last 32 kB of the data stream to be accessed for the backward reference search, based merely on the longest matching sequence. Selection of arbitrary sequences in this manner results in increased entropy in the backward references. By contrast, in one embodiment the optimized backward reference selection module 120 is configured to increases the density of the backward references by selecting only from backward references aligned by the data element size in bytes. More precisely, for a multi-byte data element with a data element size of $C_{comp}$, the selection module 120 selects backward reference distances $D_{br}$ at a position I where $D_{br}$ and I are integer multiples of $C_{comp}$. In one embodiment, the modulo function is used to implement the integer multiple of $C_{comp}$ requirement. In another embodiment, only I being integer multiples of $C_{comp}$ is required to reduce the number of backward references to be computed.

In the example illustrated in FIG. 2, a data component, i.e., G 202, of a truecolor, multi-component (R, G, B) PNG image is to be processed. Thus, $C_{comp}$ is 3 bytes. The selection module 120 evaluates backward references at 3 bytes away from G 202, then at 6, 9 and 12, bytes away and so on until a match is made. The four arrows 208a-208d originated from G 202 represents the above offsets that are checked. The backward reference selection is aligned by the size of $C_{comp}$. As such, the backward reference selection module 120 need not check for rarely occurring backward references between the data components, e.g. a red component value being identical to a blue component value—and this makes the next entropy encoding phase faster and more efficient. When a matching byte sequence is located at the appropriate offset it is encoded as described above.

In addition to selecting the backward reference distances at the positions that are multiples of the data element size in bytes, the optimized backward reference selection module 120 may be configured to reduce the entropy of the backward reference length data by quantizing backward reference length to integer multiples of the data element size. More specifically, for a multi-byte data element with a data element size of $C_{comp}$, the selection module 120 is configured to evaluate sequences that have a backward reference length $L_{br}$, where $L_{br}$ is an integer multiple of $C_{comp}$. Since backward reference lengths are encoded together with data literals in the same entropy encoding, having less variety, i.e. smaller information entropy, in the backward reference lengths not only simplifies the backward reference computation, but more importantly, also helps in reducing the entropy of the generated backward references.

Using the same example illustrated in FIG. 2, to process G 202, the selection module 120 first evaluates at a backward reference at 3 bytes away from G 202, represented by arrow 208a. The selection module continuously moves its search pointer backward from G component indicated by arrow 208a through the reference search buffer 230 searching for a longer match for elements after G 202, i.e., B, R, etc. The selection module 120 records the current longest match. Then the selection module 120 searches for another match at next 6 bytes away for G 202 and a sequence of elements following G 202 in the look-ahead buffer 220. The selection module 120 repeats the above steps at 9 and 12 bytes away from G 202. Once the longest match is found, the selection module 120 checks whether the length of the longest match is an integer multiple of $C_{comp}$, i.e. 3 bytes. In one embodiment, in response to the length of the longest match not being an integer multiple of $C_{comp}$, the selection module 120 may select the next longest match as the backward reference whose length meets the integer multiple requirement.

Figure 3:
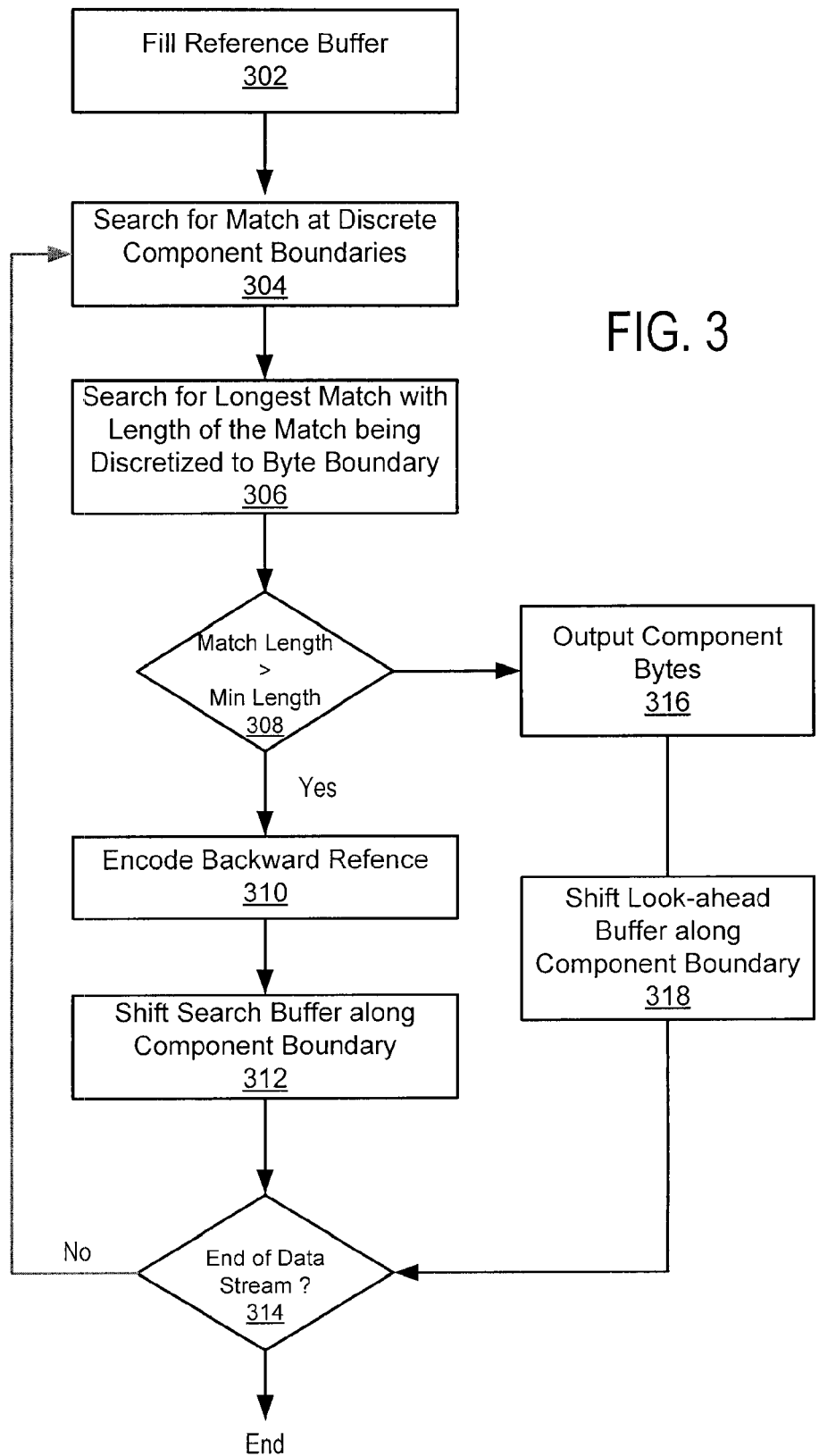
FIG. 3 is a flowchart showing a method of using an optimized backward reference selection module according to one embodiment.

FIG. 3 is a flowchart showing a method of using an optimized backward reference selection module 120 according to one embodiment. Other embodiments perform different and/or additional steps than the ones described here. Moreover, other embodiments perform the steps in different order than that described below.

Initially, the optimized backward reference selection module 120 fills 302 the reference search buffer 230 with the previously processed data elements and look-ahead buffer 220 with a sequence of data elements to be processed. The selection module 120 searches 304 for a match for the data element to be processed in the reference search buffer 230. Each new search is conducted at the discrete component boundaries, e.g., 3 bytes away, then 6, 9, 12 bytes way, etc. For each match found, the selection module 120 continuously searches 306 for a longest match starting from the first element of the match. The length of the longest match is further discretized by the data element size. If the length of a selected sequence is smaller than a minimum length threshold, in one embodiment, the selection module 120 outputs 316 the component bytes to the entropy module 130 indicating no favorable backward reference having been found. The selection module 120 shifts 318 the look-ahead buffer 220 along the component boundary to process next data element. The minimum length threshold is a design-specific parameter, which can be chosen based on a plurality of factors, such as image content. By checking the length of a match against a threshold value, the selection module 120 is able to avoid unnecessarily encoding short backward references. If the length of the match selected is larger than the minimum length threshold, the selection module 120 outputs the backward reference for the entropy encoder 130 to encode 310 the backward reference. The selection module 120 also shifts 312 the reference search buffer 230 along the component boundaries for conducting next search. The search ends when the end of data stream has been reached 314. Otherwise, the selection module 120 begins a new search at step 304.

To further increase backward reference selection optimization, optimized backward reference selection module 120 may be configured to select the backward references from a previous row of data because common features in image signals are repeated more locally, given the spatial arrangement of the image data, than far away. This inherent locality of the image signal is often called proximity. A two-dimensional image signal in lossless image compression is most commonly encoded into a one-dimensional signal, using the formula (1) below, $$f(x,y)=x+yS_x, \quad (1)$$

where (x, y) is the coordinates of the image signal in two-dimensional space; $f(x, y)$ is the position of the image signal (x, y) in one-dimensional compressed stream, and $f(x, y)$ is a function with (x, y) as input, and $S_x$ is the size reserved for one row of image signals in two-dimensional space. Conventional backward reference selection algorithm only selects the backward reference distances that are close, according to the number of bytes, i.e. smaller $f(x, y)$. The optimized backward reference selection module 120 favors the backward references that are $S_xC_{comp}$ bytes away, which allows for selection of reference that are spatially closer in the image, even if numerically further away in the data stream itself. For example, for a 256×256 data-component-wide truecolor image, the selection module 120 may be configured to select data components from the previous row of data components, which is 768 bytes away from the current data component (256 components per row, 3 bytes per component), instead of data that describe pixels further away on the same row, but closer in the data stream representation of the image. Consequently, favoring the inherent spatial locality of the image signals leads to smaller entropy codes, thus a better overall compression ratio.

Figure 4A:
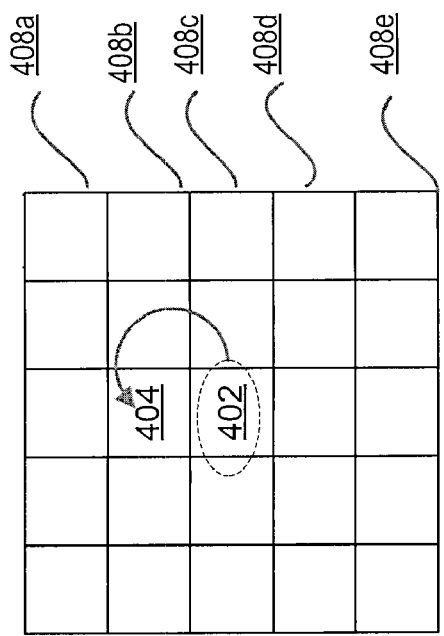
FIG. 4A is an illustration of an image data stream with a plurality of image signals in a two-dimensional space processed by an optimized backward reference selection module according to one embodiment.
Figure 4B:
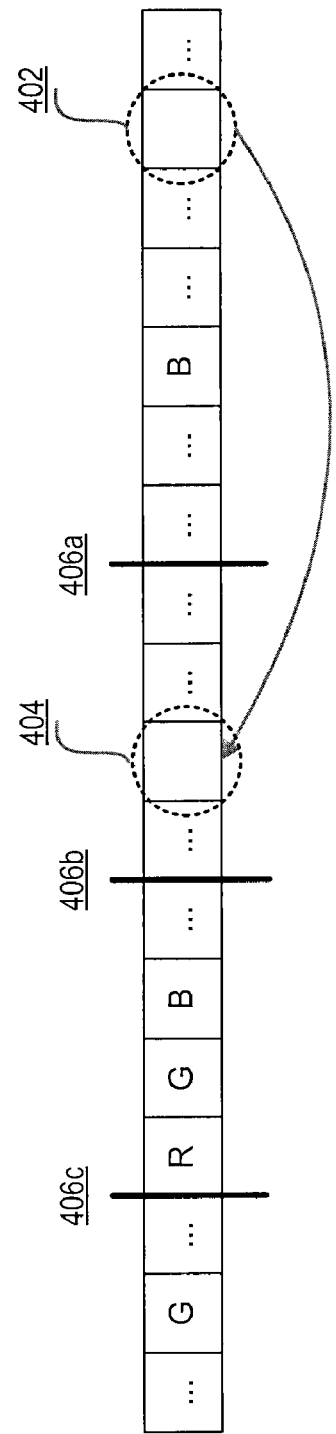
FIG. 4B illustrates the same image data stream depicted in FIG. 4A in one-dimensional space.

FIG. 4A is an image data stream with a plurality of image signals in a two-dimensional space processed by an optimized backward reference selection module 120 according to one embodiment. The stream includes five rows of image signals, rows 408a-408e. Each square in FIG. 4A stores a data component of the data stream. In FIG. 4A, row 408d is the current row of data elements being processed. For current data component 402 to be processed, among a plurality of potential backward references (not all shown in FIG. 4A) including the previously processed data component 404, the optimized backward reference selection module 120 selects the data component 404 in the immediately previous row due to the inherent locality described above. FIG. 4B illustrates the same image data stream depicted in FIG. 4A in one-dimensional space. The thick vertical lines 406 mark the row boundaries. For the current data component 402, the optimized backward reference selection module 120 selects the data component 404 located at immediately previous row.

In one embodiment, the optimized backward reference selection module 120 uses a cost function that evaluates the cost of a match found in terms of the length and distance of the match. The backward reference of a match with the lowest cost is selected as the backward reference. The cost function is formulated by the formula (2) below, $$\text{cost(match}[i])=\text{cost\_lookup[backward\_distance]}-[\text{match\_length}*65,536] \quad (2)$$

where cost(match[i]) is the cost of the ith match, match[i]; match_length is the length of the match[i]; cost_lookup [backward_distance] is a function of backward distance to generate a cost of the backward distance. In one embodiment, the function of backward distance is a cost look-up table indexed by the backward distance. In other embodiments, the function of the backward distance is a computation on the backward distance resulting in a cost for the backward distance.

This cost function allows for an arbitrary function to be used for manipulating cost as a function of the backward reference distance. The cost function ensures that longer matches are always selected over shorter matches, and the matches with lengths being an integer multiple of the data element size are always selected over the matches, the lengths of which are not an integer multiple by the data element size. In the case of the length of the longest match not being an integer multiple of the data element size, the next longest match, the length of which is an integer multiple of the data element size, is chosen to calculate the cost by the cost function (2) above.

In one embodiment, the cost look-up table may be a simple linear function. To favor the backward reference distances that are an integer multiple of the size of data element, the cost look-up table is modified to assign smaller value to these favorable backward reference distances. To select the backward references that are in the previous row above the current data component being processed, the cost look-up assigns smaller value for the data components in the previous row. For example, for a 256×256 data-component-wide truecolor image, cost_lookup[previous_row_data_components]=16 although the previous row is 768 bytes away from the current data component.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for optimizing data compression, the method comprising:
    storing a plurality of data elements in an uncompressed data buffer in a memory, each data element comprising at least one data component, and having a known size;
    selecting a backward reference aligned by the size of the data element in a compressed data buffer for the plurality of the data elements;
    entropy encoding the plurality of data elements and its associated backward reference; and
    storing the entropy encoded plurality of data elements in the compressed data buffer.

2. The method of claim 1, wherein the size of a data element is the number of the data components of the data element multiplied by the size of the data component.

3. The method of claim 1, wherein selecting a backward reference aligned by the size of the data element comprises selecting a backward reference whose backward reference distance is an integer multiple of the size of a data element.

4. The method of claim 1, wherein selecting a backward reference aligned by the size of the data element further comprises selecting a longest backward reference whose backward reference length is an integer multiple of the size of a data element.

5. The method of claim 1, wherein selecting a backward reference aligned by the size of the data element further comprises selecting a longest backward reference by a cost function of backward reference distance from a plurality of backward references.

6. The method of claim 1, wherein selecting a backward reference aligned by the size of the data element further comprises further comprises selecting a backward reference having a preferred locality order.

7. The method of claim 6, wherein selecting a backward reference having a preferred locality order comprises selecting a data element among a plurality of rows of data elements at a location that is one or more complete rows away.

8. The method of claim 1, wherein the entropy encoding is Huffman encoding.

9. A system for optimizing data compression, the method comprising:
    an uncompressed data buffer configured to store a plurality of data elements in an uncompressed data buffer, each data element comprising at least one data component, and having a known size;
    a reference selection module configured to select a backward reference aligned by the size of the data element in a compressed data buffer for the plurality of the data elements;
    an entropy encoder configured to entropy encode the plurality of data elements and its associated backward reference; and
    a compressed data buffer configured to store entropy encoded plurality of data elements in the compressed data buffer.

10. The system of claim 9, wherein the size of a data element is the number of the data components of the data element multiplied by the size of the data component.

11. The system of claim 9, wherein the reference selection module is configured to select a backward reference whose backward reference distance is an integer multiple of the size of a data element.

12. The system of claim 9, wherein the reference selection module is configured to select a longest backward reference whose backward reference length is an integer multiple of the size of a data element.

13. The system of claim 9, wherein the reference selection module is configured to select a longest backward reference by a cost function of backward reference distance from a plurality of backward references.

14. The system of claim 9, wherein the reference selection module is further configured to select a backward reference having a preferred locality order.

15. The system of claim 14, wherein the reference selection module is configured to select a data element among a plurality of rows of data elements at a location that is one or more complete rows away.

16. The system of claim 9, wherein the entropy encoding is Huffman encoding.

17. A non-transitory computer-readable storage medium having computer executable modules contained therein for optimizing data compression, the computer executable modules comprising:
    an uncompressed data buffer configured to store a plurality of data elements in an uncompressed data buffer, each data element comprising at least one data component, and having a known size;
    a reference selection module configured to select a backward reference aligned by the size of the data element in a compressed data buffer for the plurality of the data elements;
    an entropy encoder configured to entropy encode the plurality of data elements and its associated backward reference; and
    a compressed data buffer configured to store entropy encoded plurality of data elements in the compressed data buffer.

18. The computer-readable storage medium of claim 17, wherein the size of a data element is the number of the data components of the data element multiplied by the size of the data component.

19. The computer-readable storage medium of claim 17, wherein the reference selection module is configured to select a backward reference whose backward reference distance is an integer multiple of the size of a data element.

20. The computer-readable storage medium of claim 17, wherein the reference selection module is configured to select a longest backward reference whose backward reference length is an integer multiple of the size of a data element.

21. The computer-readable storage medium of claim 17, wherein the reference selection module is configured to select a longest backward reference by a cost function of backward reference distance from a plurality of backward references.

22. The computer-readable storage medium of claim 17, wherein the reference selection module is further configured to select a backward reference having a preferred locality order.

23. The computer-readable storage medium of claim 22, wherein the reference selection module is configured to select a data element among a plurality of rows of data elements at a location that is one or more complete rows away.

24. The computer-readable storage medium of claim 17, wherein the entropy encoding is Huffman encoding.

* * * * *